United States Patent [19]

Meuleman

[11] Patent Number: 5,110,086

[45] Date of Patent: May 5, 1992

[54] IRRIGATION VALVE WITH BAFFLE AND SEALS

[75] Inventor: Guy A. Meuleman, Rupert, Id.

[73] Assignee: Aqua Control, Inc., Rupert, Id.

[21] Appl. No.: 693,541

[22] Filed: Apr. 30, 1991

[51] Int. Cl.$^5$ .............................................. F16K 5/04
[52] U.S. Cl. ..................... 251/118; 239/461; 251/127; 251/310; 251/352
[58] Field of Search ............... 239/461; 251/118, 127, 251/352, 309, 310, 314

[56] References Cited

U.S. PATENT DOCUMENTS

| | | | |
|---|---|---|---|
| 865,451 | 9/1907 | Swift | 251/118 |
| 3,325,143 | 6/1967 | Phillips | 251/314 X |
| 4,543,990 | 5/1985 | Meuleman | 137/556 |
| 4,589,690 | 5/1986 | Meuleman | 285/162 |
| 4,844,413 | 7/1989 | Weber | 251/314 |

Primary Examiner—Robert G. Nilson
Attorney, Agent, or Firm—Walter C. Farley

[57] ABSTRACT

An improved irrigation valve has a valve housing with a tubular passage and an inlet opening in one side. The valve housing can be attached to an opening in an irrigation pipe so that water from the pipe can flow into the housing and through the inlet opening. A tubular valve in the tubular passage has a flow opening in its wall and an open outlet end, the valve member being rotatable in the passage to align the flow opening with the inlet opening to different degrees to control the flow of water through the valve from the pipe to the outlet. A baffle extends along an inside wall of the valve member to interfere with circular flow of water within said valve member to thereby reduce a fan effect at the outlet which such circular flow causes, the fan being a cause of erosion of the irrigated soil. Annular and axial ribs between the valve member and tubular passage reduce the ingress of dirt to reduce maintenance of the valve.

7 Claims, 3 Drawing Sheets

IRRIGATION VALVE WITH BAFFLE AND SEALS

FIELD OF THE INVENTION

This invention relates to an improved irrigation valve for use in an irrigation system of the type known as gated pipe.

BACKGROUND OF THE INVENTION

In U.S. Pat. Nos. 4,543,990 and 4,589,690 (Meuleman) valves are disclosed which are intended for use in gated irrigation pipe. These patents describe the general background of irrigation using gated pipe which will not be repeated herein.

The present invention involves an improvement to valves of the type shown in those patents. Those valves include a valve housing which has a tubular passage and an attachment arrangement for connecting the passage to an opening in an irrigation pipe which has a significantly larger diameter than the passage. An inlet opening permits water to flow from the pipe into the passage. The passage receives a tubular valve member which slides into the passage and can be rotated therein. The valve member has an open bottom end and a flow opening in its cylindrical wall which can be aligned with the inlet opening in the tubular passage to permit water to flow from the pipe into the interior of the valve member and out of its open bottom. The flow is simply a gravity flow, the rate of which is determined, in part, by the level and pressure of the water in the irrigation pipe.

The flow is also controlled by the rotational position of the valve member to alter the degree of overlap of the inlet opening and the flow opening. As the valve member is rotated away from the fully-aligned position, the opening overlap is decreased, decreasing the total amount of water which can pass through the valve. While this control is necessary and desirable to optimize the use of irrigation water, it has been found that under certain pressure conditions, the water tends to flow in a circular pattern through a partly open valve, resulting in a fan-shaped discharge from the bottom of the valve member. This fan-shaped discharge pattern has a highly undesirable erosion effect when it strikes the soil below the valve. The effect is particularly noticeable when the valve is made rather short, even though it is desirable to make the valve short for cost and other reasons.

It has also been found with the valves disclosed in the above-mentioned patents that, under field conditions, dirt tends to accumulate between the tubular passage and the valve member, requiring that the valve be periodically disassembled and cleaned, an undesirable maintenance problem.

SUMMARY OF THE INVENTION

Accordingly, an object of the present invention is to provide an improved valve in which the water discharge pattern is improved.

A further object is to provide such a valve in which sealing ribs are included to minimize the ingress of dust and dirt, thereby reducing the need for periodic maintenance.

Briefly described, the invention comprises an improved irrigation valve including a valve housing with a tubular passage and means defining an inlet opening in a side of the tubular passage. The valve housing has means for attachment to an opening in a pipe so that water from the pipe can flow into the housing and through the inlet opening. A tube valve member is slidably and rotatably received in the tubular passage, the valve member having a cylindrical wall and an open outlet end. The valve member has means defining a flow opening in the cylindrical wall, the valve member being rotatable in the passage to align with varying degrees the flow opening in the valve member with the inlet opening in the housing to thereby control the flow of water through the valve to the outlet end. A baffle extends generally axially within the valve member adjacent an inner surface of the cylindrical wall to interfere with flow of water within the valve member in a circular direction relative to the central axis of the valve member.

In a further aspect of the present invention, the valve includes annular ribs encircling an outer surface of the valve member between the flow opening and the open end and between the flow opening and the other end to form barriers against the entry of foreign material. The tubular passage includes an inner surface with a plurality of axially extending, substantially parallel ribs adjacent each end of the inlet opening and lying beyond the ends of the inlet opening to further minimize the ingress of foreign material.

BRIEF DESCRIPTION OF THE DRAWINGS

In order to impart full understanding of the manner in which these and other objects are attained in accordance with the invention, particularly advantageous embodiments thereof will be described with reference to the accompanying drawings, which form a part of this disclosure, and wherein.

DESCRIPTION OF THE PREFERRED EMBODIMENTS

Figure 1:
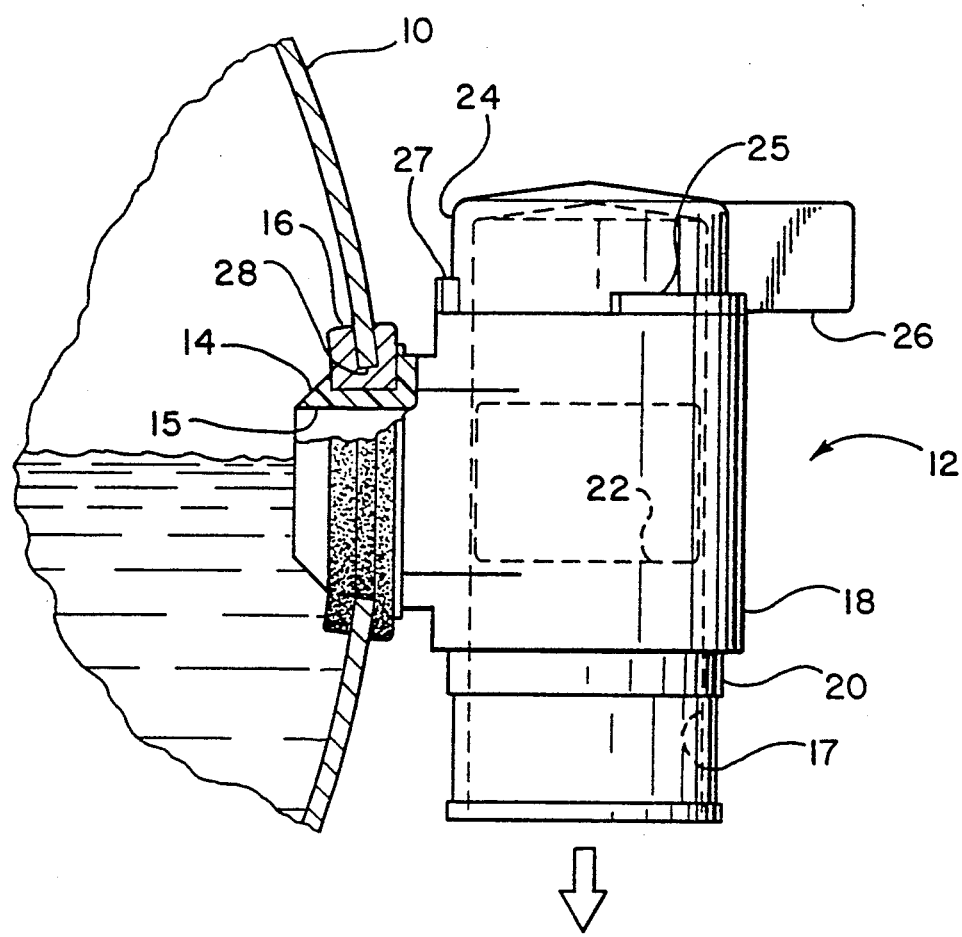
FIG. 1 is a side elevation, in partial section, of a valve structure in accordance with the invention supported in an opening in a gated irrigation pipe.

FIG. 1 shows an assembled valve structure in accordance with the invention mounted in an irrigation pipe indicated generally at 10 which is a relatively large diameter pipe used to convey water to channels into which the water will be dispensed for irrigation. The valve, indicated generally at 12, is coupled to pipe 10 by an attachment structure 14 including a gasket 16 and a short, generally rectangular section of conduit having an interior inlet passage 15.

The valve includes a valve housing 18 comprising a hollow tubular member fixedly attached to conduit 14. The valve housing 18 has a tubular passage 17 therethrough which slidably receives a valve member 20. Valve member 20 is a tubular member having a generally rectangular flow opening 22 through a side wall thereof. At the upper end of valve member 20 is a closed top portion 24 having an enlargement 25 to cooperate with a stop member 27 on the valve housing and a laterally protruding blade 26 which acts as a handle for establishing the rotational position of valve member 20 in housing 18. Conduit 14 and inlet opening 15 therethrough admit water to the interior of the valve housing and, when flow opening 22 in valve member 20 is aligned with the inlet opening, permits water to flow from the interior of pipe 10 through the inlet opening in the conduit and the flow opening 22 into tube 20 and out of the open lower end of valve member 20 into an irrigation channel as indicated by arrow A. The degree of alignment of opening 22 with the inlet opening in conduit 14 establishes the quantity of flow under any predetermined set of pressure and water level conditions in pipe 10.

The detailed structure of gasket 16 and the manner of installing the valve assembly in the pipe are described in the previously mentioned patents and will not be repeated herein. Preferably, the valve member, valve housing and other components (except for gasket 16) are molded from a weather-resistant polymer such as poly propylene. The gasket is a soft elastomer.

Figure 2:
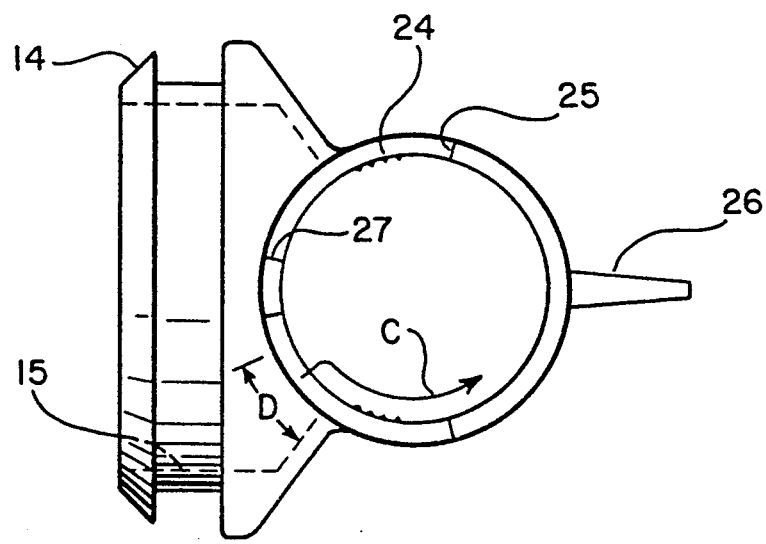
FIG. 2 is a top plan view of the valve of FIG. 1.

In the position shown in FIG. 1, opening 22 in valve member 20 is only partly aligned with the inlet opening into body 18 from conduit 15. The extent of opening is indicated approximately in FIG. 2 by the distance D. Water flows through the small opening at one side of inlet opening 15 and tends to flow in a circular fashion in the direction indicated by arrow C, around the interior of valve member 20. As indicated above, this circular flow of water within the valve tends to create a fan-like pattern as the water emerges from the bottom of the valve member, causing erosion of the soil into which the water is sprayed. The fan emerging from the bottom of the valve can be as large as 7 to 10 inches across.

Figure 3:
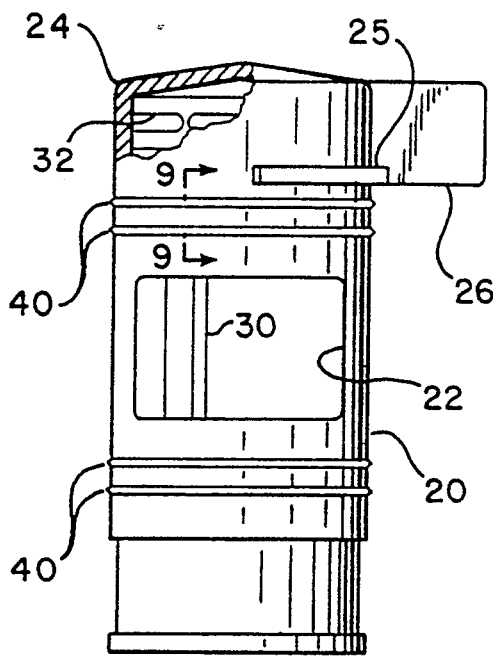
FIG. 3 is a side elevation of the valve member, apart from the valve housing, partially cut away and showing the flow opening therein and the baffle structure.

To reduce this effect, a baffle member is inserted into the valve member as illustrated in FIG. 3. The baffle includes an elongated baffle blade 30 which is attached to a support member 32. Baffle support member 32 is a generally circular body which is inserted into the valve member and resides within closed end portion 24. The baffle blade 30 extends axially from the support member along the interior of valve member 20.

Figure 4:
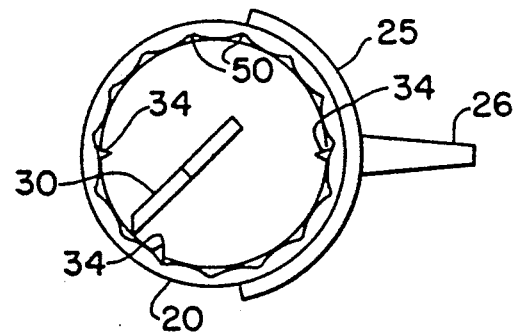
FIG. 4 is a bottom plan view of the valve member of FIG. 3.

As seen in FIG. 4, blade 30 is positioned on the opposite side of the interior of valve member 20 from opening 22 and lies in a plane at an angle of approximately 135° from the plane containing handle 26. In order to position the blade at this location and maintain it in that position, the interior of valve member 20 is provided with three axially extending ribs 34 and the support member 32, as seen in FIGS. 5 and 6, is provided with three axially extending grooves, the grooves and ribs being non-uniformly circularly spaced so that they mate in only one circular position of the support member relative to the valve member.

Figure 5:
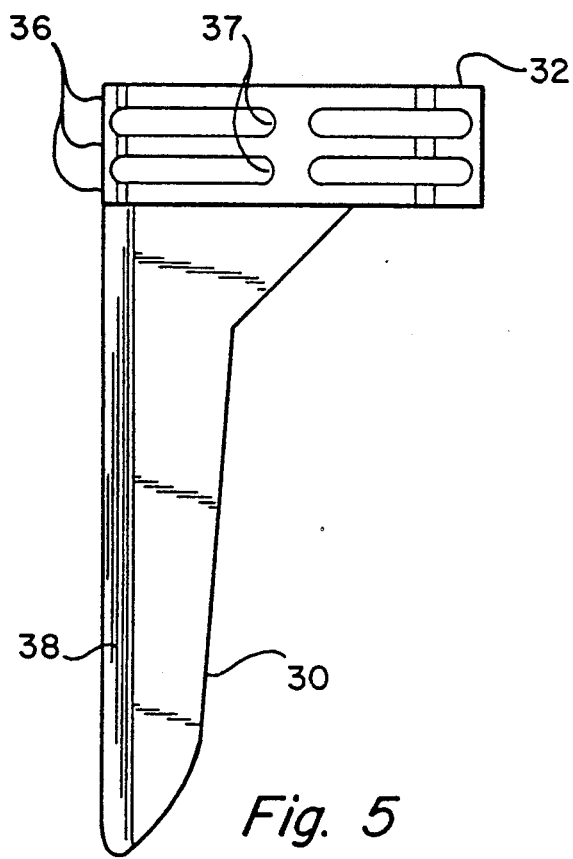
FIG. 5 is a side elevation of an insertable baffle structure removed from the valve member.
Figure 6:
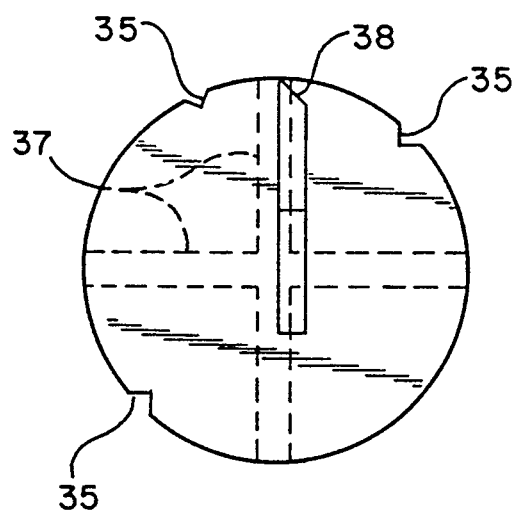
FIG. 6 is a bottom plan view of the baffle structure of FIG. 5.

As best seen in FIG. 5, the support member is a molded body in the form of three disks 36 joined by intervening ribs 37 and forms a sturdy support for the blade 30 with use of minimum material. The blade itself is an elongated, relatively thin member with a chamfer of approximately 45° along the edge 38 closest to the inner surface of valve member 20.

With the baffle in place as illustrated, the size of the fan is reduced to about 2 to 5 inches, a size which does not produce a significant erosion problem. The baffle is effective to reduce the fan size when the valve opening is between its fully closed and about one half open position. With a larger opening than one half, flowing water does not tend to enter into the circular pattern and the production of a fan is not a problem.

The baffle can also be unitarily formed in valve member 20 by the molding operation which forms the valve member. However, this requires a somewhat more complicated mold. Also, there are circumstances in which the baffle is not needed when, for example, the water level and pressure are such that no fan is created. Those valves which are attached to the gate pipe at the upper end (near the source) are exposed to somewhat different pressure and level conditions than those at the lower end. Having an insertable baffle allows the user to select which valves require its use and to install it in only those valves, reducing the total cost.

At the lower end of valve member 20, as seen in FIG. 4, the inner surface of the valve member is provided with a plurality of shallow grooves 50 typically formed at about 24° intervals. The grooves and the intervening lands are smoothly contoured into each other to form an undulating surface which further acts to disturb any circular flow which remains in the exiting water.

As previously mentioned, with earlier valves of this type foreign matter tended to enter the small space between the outer surface of valve member 20 and the tubular passage in body 18. After an interval of time, this foreign material frequently caused the valve to seize so that it could no longer be adjusted. It was then necessary to remove the valve, disassemble and clean it, and return it to service.

This problem is effectively reduced by the incorporation of sets of annular ribs 40 and 42 above and below opening 22 around valve member 20. These annular ribs are relatively small, in the order of 0.001 inches in height, but are effective to close the slight gap between the valve member and the tubular passage to inhibit the entry of this foreign material.

Figure 9:
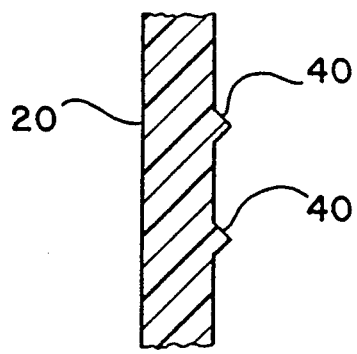
FIG. 9 is a fragmentary sectional view along line 9—9 of FIG. 3.

A partial enlarged view of ribs 40 is shown in FIG. 9. The ribs are formed initially with a V-shape and have a total height greater than the normal gap between the valve member and the tubular passage in which it fits. The relatively pointed outer limits of the ribs soon become blunted after installation and conform to the space between the parts, forming a very effective seal.

Figure 7:
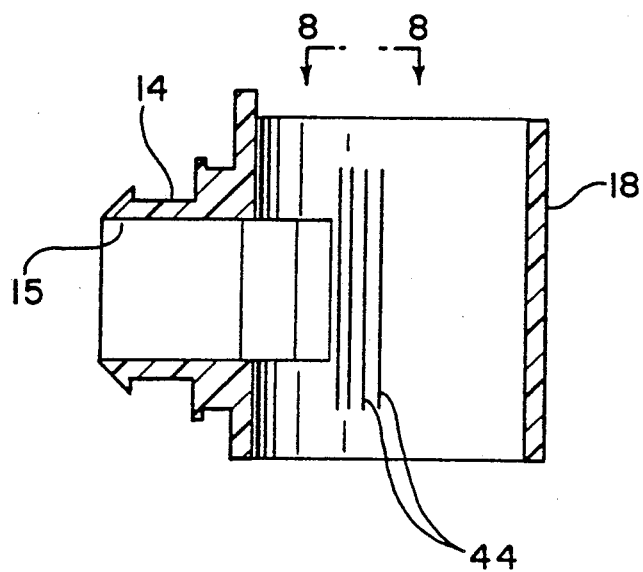
FIG. 7 is a side elevation, in section, of the valve housing, apart from the valve member, showing the sealing ribs therein.
Figure 8:
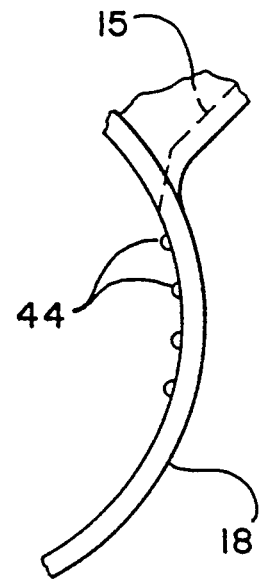
FIG. 8 is an enlarged partial top plan view along line 8—8 of FIG. 7 showing the sealing ribs.

In addition, as shown in FIG. 7, axially extending parallel ribs 44 are formed on the inner surface of the tubular passage on opposite sides of the inlet opening from conduit 15. These ribs engage the outer surface of the valve member and perform a similar function of not admitting foreign material into the space between the members. FIG. 8 shows an enlarged view of these ribs.

While certain advantageous embodiments have been chosen to illustrate the invention, it will be understood by those skilled in the art that various changes and modifications can be made therein without departing from the scope of the invention as defined in the appended claims.

What is claimed is:

1. An improved irrigation valve comprising the combination of a valve housing having means defining a tubular passage therein;

means defining an inlet opening in a side of said tubular passage;

means for attaching the valve housing to an opening in a pipe so that water from the pipe can flow into the housing and through the inlet opening; and a tubular valve member slidably and rotatably received in the tubular passage, said valve member having a cylindrical wall, a central axis and an open outlet end, said valve member including means defining a flow opening in said cylindrical wall, said valve member being rotatable in said passage to align with varying degrees said flow opening in said valve member with said inlet opening in said housing to thereby control the flow of water through said valve from said pipe to said outlet end, a baffle extending generally axially within said valve member adjacent an inner surface of said cylindrical wall to interfere with flow of water within said valve member in a circular direction relative to said central axis a closed end opposite said open outlet end, said flow opening being located intermediate said open and closed ends, and a baffle support comprising a generally circular body insertable into said valve member to a location between said closed end and said flow opening, said baffle being carried by said baffle support.

2. A valve according to claim 1 and further comprising a first annular rib encircling an outer surface of said valve member between said flow opening and said open end, and a second annular rib encircling an outer surface of said valve member between said flow opening and said closed end, said ribs forming barriers to the entry of foreign material.

3. A valve according to claim 2 wherein said inlet opening in said tubular passage extends circularly around said tubular passage and subtends an arc of less than 180°, and wherein said tubular passage comprises an inner surface and a plurality of axially extending, substantially parallel ribs adjacent each end of said inlet opening, said parallel ribs lying beyond the ends of said inlet opening.

4. A valve according to claim 3 and further comprising means defining a plurality of circularly spaced, generally axially extending grooves adjacent said outlet end of said valve member.

5. An improved irrigation valve comprising the combination of a valve housing having means defining a tubular passage therein;

means defining an inlet opening in a side of said tubular passage;

means for attaching the valve housing to an opening in a pipe so that water from the pipe can flow into the housing and through the inlet opening; and a tubular valve member slidably and rotatably received in the tubular passage, said valve member having a cylindrical wall, a central axis and an open outlet end, said valve member including means defining a flow opening in said cylindrical wall, said valve member being rotatable in said passage to align with varying degrees said flow opening in said valve member with said inlet opening in said housing to thereby control the flow of water through said valve from said pipe to said outlet end, a baffle extending generally axially within said valve member adjacent an inner surface of said cylindrical wall to interfere with flow of water within said valve member in a circular direction relative to said central axis, and a second end opposite said open outlet end, said flow opening being located intermediate said open and second ends, said valve further including a baffle support comprising a generally circular body insertable into said valve member to a location between said closed end and said flow opening, said baffle being carried by said baffle support, said circular body having at least one axial groove along an outer peripheral surface thereof, said cylindrical wall in said valve member further including an axially extending rib matable with said axial groove to circularly position said circular body and said baffle carried thereby.

6. A valve according to claim 6 wherein said flow opening in said valve member subtends an angle of about 135° as measured relative to said central axis, and said valve member is rotatable to allow the extent of alignment of said flow and inlet openings to be varied between a full open position in which said openings are substantially fully aligned and a minimum flow position in which said openings are not aligned.

7. An improved irrigation valve comprising the combination of a valve housing having means defining a tubular passage therein;

means defining an inlet opening in a side of said tubular passage;

means for attaching the valve housing to an opening in a pipe so that water from the pipe can flow into the housing and through the inlet opening; and a tubular valve member slidably and rotatably received in the tubular passage, said valve member having a cylindrical wall, a central axis and an open outlet end, said valve member including means defining a flow opening in said cylindrical wall, said valve member being rotatable in said passage to align with varying degrees said flow opening in said valve member with said inlet opening in said housing to thereby control the flow of water through said valve from said pipe to said outlet end, a baffle extending generally axially within said valve member adjacent an inner surface of said cylindrical wall to interfere with flow of water within said valve member in a circular direction relative to said central axis, and means defining a plurality of circularly spaced, generally axially extending grooves adjacent said outlet end of said valve member.

* * * * *